United States Patent
Kurabe et al.

(10) Patent No.: US 7,031,369 B2
(45) Date of Patent: Apr. 18, 2006

(54) ORTHOGONAL CODE GENERATING CIRCUIT

(75) Inventors: Asako Kurabe, Kanagawa (JP); Hirofumi Matsushita, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 758 days.

(21) Appl. No.: 10/057,879

(22) Filed: Jan. 29, 2002

(65) Prior Publication Data

US 2002/0136269 A1 Sep. 26, 2002

(30) Foreign Application Priority Data

Jan. 30, 2001 (JP) .......................... P2001-021952

(51) Int. Cl.
*H04B 1/69* (2006.01)
*G06F 17/14* (2006.01)

(52) U.S. Cl. ...................................... 375/140; 708/410
(58) Field of Classification Search ................ 375/140, 375/142, 146, 147, 150, 152, 343; 708/410; 341/173–192
See application file for complete search history.

(56) References Cited

U.S. PATENT DOCUMENTS

| | | | |
|---|---|---|---|
| 3,795,864 A * | 3/1974 | Fullton, Jr. ................. | 708/410 |
| 5,193,094 A * | 3/1993 | Viterbi ........................ | 714/795 |
| 5,311,176 A * | 5/1994 | Gurney ........................ | 341/50 |
| 6,069,574 A * | 5/2000 | Eo et al. ...................... | 341/50 |
| 6,181,732 B1 * | 1/2001 | Komatsu ..................... | 375/150 |
| 6,515,980 B1 * | 2/2003 | Bottomley .................. | 370/342 |

FOREIGN PATENT DOCUMENTS

| | | |
|---|---|---|
| JP | 11-177529 | 7/1999 |
| JP | P2000-89933 A | 3/2000 |
| WO | WO 95/03652 | 2/1995 |
| WO | WO 01/50658 A1 | 7/2001 |

* cited by examiner

*Primary Examiner*—Kenneth Vanderpuye
*Assistant Examiner*—Jason M. Perilla
(74) *Attorney, Agent, or Firm*—McDermott Will & Emery LLP

(57) ABSTRACT

An orthogonal code generating circuit 10 is arranged by a counter circuit unit 12, a combination circuit unit 14 of orthogonal codes, and a control circuit unit 16. Furthermore, the combination circuit unit 14 is constructed of an AND gate 14a and an exclusive-OR gate 14b. The control circuit unit 16 outputs a decode output in response to a set code designation signal CNo. When a code generation starting signal ST is inputted, a counter circuit 12 starts to output a counter output. Both the decode output and the counter output are entered to the combination circuit unit 14 which AND-gates the corresponding output bits with each other, and thereafter, exclusively OR-gates the AND-gated outputs, and then outputs the exclusively OR-gated signal as serial data of an orthogonal code. As a consequence, since the conventional ROM unit for storing thereinto the orthogonal codes can be omitted, the circuit scale of the orthogonal code generating circuit 10 can be reduced.

1 Claim, 8 Drawing Sheets

FIG. 1

$$H_3 = \begin{bmatrix} H_2 & H_2 \\ H_2 & \overline{H_2} \end{bmatrix}$$

$$= \begin{bmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix}$$

COLUMN NUMBER: 000, 001, 010, 011, 100, 101, 110, 111

ROW NUMBER: 000, 001, 010, 011, 100, 101, 110, 111

FIG. 2 (a)

ROW "001"   COLUMN "000"   VALUE OF ROW NUMBER "001" CORRESPONDING TO COLUMN NUMBER "000"

1 (0TH BIT VALUE) x 0 (0TH BIT VALUE) +
0 (1ST BIT VALUE) x 0 (1ST BIT VALUE) +
0 (2ND BIT VALUE) x 0 (2ND BIT VALUE) = 0

FIG. 2 (b)

ROW "001"   COLUMN "001"   VALUE OF ROW NUMBER "001" CORRESPONDING TO COLUMN NUMBER "001"

1 (0TH BIT VALUE) x 1 (0TH BIT VALUE) +
0 (1ST BIT VALUE) x 0 (1ST BIT VALUE) +
0 (2ND BIT VALUE) x 0 (2ND BIT VALUE) = 1

FIG. 2 (c)

ROW "abc"   COLUMN "def"   VALUE OF ROW NUMBER "abc" CORRESPONDING TO COLUMN NUMBER "def"

c (0TH BIT VALUE) x f (0TH BIT VALUE) +
b (1ST BIT VALUE) x e (1ST BIT VALUE) +
a (2ND BIT VALUE) x d (2ND BIT VALUE) = X $$\begin{bmatrix} C_2(0) \\ C_2(1) \\ C_2(2) \\ C_2(3) \end{bmatrix} = \begin{bmatrix} 0 & 0 & 0 & 0 \\ 0 & 0 & 1 & 1 \\ 0 & 1 & 0 & 1 \\ 0 & 1 & 1 & 0 \end{bmatrix}$$

COLUMN NUMBER: 00 01 10 11

| ROW NUMBER OF HIERARCHICAL ORTHOGONAL CODE | | ROW NUMBER OF HADAMARD MATRIX |
|---|---|---|
| 00 | ← | 00 |
| 01 | ← | 10 |
| 10 | ← | 01 |
| 11 | ← | 11 |

$$H_3 = \begin{bmatrix} 0 & 0 & 0 & 0 & 0 & 0 & 0 & 0 \\ 0 & 1 & 0 & 1 & 0 & 1 & 0 & 1 \\ 0 & 0 & 1 & 1 & 0 & 0 & 1 & 1 \\ 0 & 1 & 1 & 0 & 0 & 1 & 1 & 0 \\ 0 & 0 & 0 & 0 & 1 & 1 & 1 & 1 \\ 0 & 1 & 0 & 1 & 1 & 0 & 1 & 0 \\ 0 & 0 & 1 & 1 & 1 & 1 & 0 & 0 \\ 0 & 1 & 1 & 0 & 1 & 0 & 0 & 1 \end{bmatrix} \begin{matrix} \text{ROW NUMBER} \\ \text{(CODE NUMBER)} \\ 000 \\ 001 \\ 010 \\ 011 \\ 100 \\ 101 \\ 110 \\ 111 \end{matrix}$$

FIG. 8

$$C_3 = \begin{bmatrix} 0 & 0 & 0 & 0 & 0 & 0 & 0 & 0 \\ 0 & 0 & 0 & 0 & 1 & 1 & 1 & 1 \\ 0 & 0 & 1 & 1 & 0 & 0 & 1 & 1 \\ 0 & 0 & 1 & 1 & 1 & 1 & 0 & 0 \\ 0 & 1 & 0 & 1 & 0 & 1 & 0 & 1 \\ 0 & 1 & 0 & 1 & 1 & 0 & 1 & 0 \\ 0 & 1 & 1 & 0 & 0 & 1 & 1 & 0 \\ 0 & 1 & 1 & 0 & 1 & 0 & 0 & 1 \end{bmatrix} \begin{matrix} \text{CODE NUMBER} \\ \text{(ROW NUMBER)} \\ 000 \\ 001 \\ 010 \\ 011 \\ 100 \\ 101 \\ 110 \\ 111 \end{matrix}$$

ORTHOGONAL CODE GENERATING CIRCUIT

BACKGROUND OF THE INVENTION

1. Field of the Invention

The present invention is related to an orthogonal code generating technique used to judge a signal stream to be transferred in a signal transfer operation of a communication system such as a spectrum spread communication system.

2. Description of the Related Art

Very recently, an orthogonal code is utilized in a correlation detection for judging a signal stream in a signal transfer operation of a communication system such as the spectrum spread communication system.

Referring now to FIG. 10, a conventional orthogonal code generating circuit will be described. FIG. 10 is a structural diagram for schematically showing the conventional orthogonal code generating circuit.

The conventional orthogonal code generating circuit 100 is arranged by a ROM unit 102, an address generating unit 104, a parallel-to-serial converting circuit 106, and a timing generating circuit 108. The ROM unit 102 stores orthogonal codes which correspond to code lengths and code numbers. The address generating unit 104 generates an address which corresponds to a code length and a code number. The parallel/serial converting unit 106 reads an orthogonal code stored in the ROM unit 102 as parallel data, and then, converts the read parallel data into serial data. The timing generating unit 108 outputs both address generation timing and conversion timing with respect to both the address generating unit 104 and the parallel/serial converting unit 106.

Next, a description is made of orthogonal code generating operation in the orthogonal code generating circuit 100.

An address of the ROM unit 102, which corresponds to a code length and a code number, is designated by the address generating unit 104 based upon the timing generating unit 108, so that data of an orthogonal code is outputted. Since this orthogonal code data is read in the form of the parallel data, this parallel data is once stored in the parallel/serial converting unit 106, and then, an orthogonal code is generated.

However, in the arrangement of the above-explained conventional orthogonal code generating circuit, if a code length and a code number of an orthogonal code are increased, then the circuit scale of the orthogonal code generating circuit is increased. For instance, when a code length of an orthogonal matrix is equal to $2^{10}=1,024$ bits, a code number is also equal to 1,024. Accordingly, in order to store all of the orthogonal codes, such a large memory capacity of $1,024 \times 1,024$ bits would be required.

Also, in a case such that orthogonal codes having different code lengths are generated, the circuit scale of the orthogonal code generating circuit is increased, and also, the circuit arrangement for the switching operations becomes complex. For example, in the case that both code lengths of $2^9$ and code lengths of $2^{10}$ of an orthogonal matrix are generated, such a memory capacity defined by ($512 \times 512$ bits + $1,024 \times 1,024$ bits) is required so as to store orthogonal codes of the respective code lengths. In addition, the circuit arrangement used to switch these orthogonal codes becomes complex.

SUMMARY OF THE INVENTION

The present invention has been made so as to solve these problems, and therefore, has an object to provide an orthogonal code generating circuit capable of reducing a circuit scale of a circuit arrangement for generating an orthogonal code.

To achieve the above-described object, an orthogonal code generating circuit, according to an aspect of the present invention, is featured by such an orthogonal code generating circuit for generating an orthogonal code which is defined as a code stream of an Hadamard matrix constructed of $2^k \times 2^k$ (symbol "k" being integer larger than, or equal to 0), comprising:

a counter circuit unit for counter-outputting code stream positional signals of the Hadamard matrix from a predetermined initial phase up to a maximum value in an increment order when a code generation starting signal is entered into the counter circuit unit;

a control circuit unit for outputting a decode output based upon a code designation signal used to designate a code number of the Hadamard matrix; and a combination circuit unit for AND-gating the counter output derived from the counter circuit unit and the decode output derived from the control circuit unit with respect to output bits corresponding thereto, and also for exclusively OR-gating the AND-gated output bits to thereby output serial data of the orthogonal code.

In accordance with this orthogonal code generating circuit, both the parallel output of the counter circuit unit and the decode output of the control circuit unit are combined by the combination circuit unit so as to output the serial data of the orthogonal code. As a result, since the ROM unit of the prior art can be omitted which is used to store the orthogonal codes, the circuit scale of the orthogonal code generating circuit can be reduced.

Also, even when the code number of the orthogonal code is increased, the decode output may be merely increased in connection thereto. Also, since the ROM unit is no longer increased, the increase of the circuit scale can be prevented, although the ROM unit is increased in the prior art.

The orthogonal code generating circuit of the present invention is featured by that the control circuit unit outputs the decode output after plural bits of the code designation signal defined from an upper-grade bit up to a down-grade bit are replaced with each other; and the combination circuit unit outputs an orthogonal code which is defined by the decode output as a code stream of a hierarchical orthogonal code.

In accordance with this orthogonal code generating circuit, while employing the orthogonal code generating circuit for generating the orthogonal code which is defined as the code stream of the Hadamard matrix, since the bits of the code designation signal defined from the upper-grade bit up to the lower-grade bit are replaced with each other in a symmetrical manner, the orthogonal code can be generated. This orthogonal code is defined as the code stream of the hierarchical orthogonal code.

The orthogonal code generating circuit of the present invention is featured by that the control circuit unit outputs the decode output in such a manner that since a code length designation signal for designating a code length shorter than, or equal to a maximum code length is inputted, the code designation signal is used so as to designate a code length designated based upon the code length designation signal; and the combination circuit unit outputs the orthogonal code made based upon the code designation signal for the designated code length.

In accordance with this orthogonal code generating circuit, even when the orthogonal codes having the different code lengths are produced, the orthogonal codes having the different code lengths can be produced, while the circuit scale thereof is not increased, but also the circuit arrangement for the switching operation is not made complex.

The orthogonal code generating circuit of the present invention is featured by that the counter circuit unit starts the counter output from the initial phase when a code initial phase setting value is entered, the initial phase corresponding to the code initial phase setting value.

In accordance with this orthogonal code generating circuit, the initial phase of the counter circuit can be set. The orthogonal code generating circuit of the present invention is featured by that the control circuit unit switches the orthogonal code related to either the Hadamard matrix or the hierarchical orthogonal code when a code generation switching signal is entered.

In accordance with this orthogonal code generating circuit, the orthogonal code defined as the code stream of the Hadamard matrix and the orthogonal code defined as the code stream of the hierarchical orthogonal code can be selectively switched to be outputted in response to the code generation switching signal.

BRIEF DESCRIPTION OF THE DRAWINGS

FIG. 1 is an explanatory diagram using an Hadamard matrix $H_3$.

FIGS. 2(a) to 2(c) show explanatory diagrams for explaining a method of calculating a value related to a row number with respect to a column number: FIG. 2(a) is an explanatory diagram for explaining a method of calculating a value as to a row number "001", corresponding to a column number "000"; FIG. 2(b) is an explanatory diagram for explaining a method of calculating a value as to a row number "001", corresponding to a column number "001"; and FIG. 2(c) is an explanatory diagram for explaining a method of calculating a value as to a row number "a b c" corresponding to a column number "d e f".

FIG. 4(a) is an explanatory diagram for showing a comparison of row numbers; and FIG. 4(b) is an explanatory diagram for indicating a bit conversion of a row number.

FIG. 8 is a diagram for showing a hierarchical orthogonal code in the case of n=3.

DESCRIPTION OF THE PREFERRED EMBODIMENTS

Figure 3:
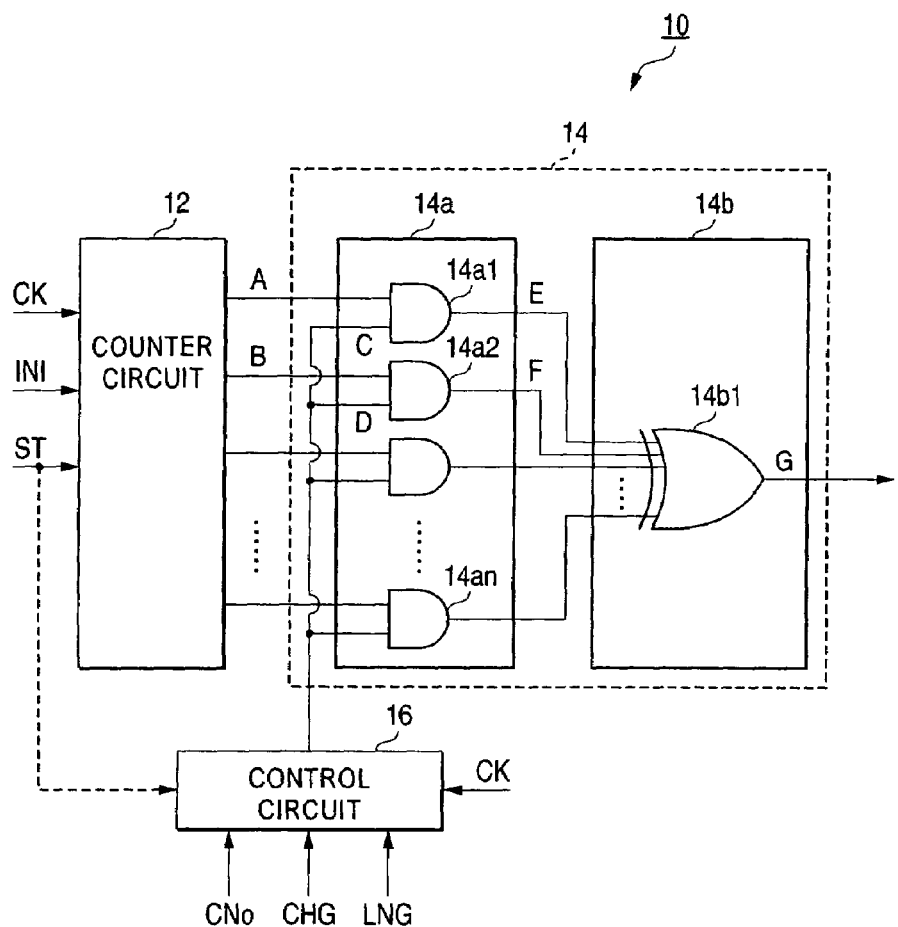
FIG. 3 is a structural diagram of an orthogonal code generating circuit according to a first embodiment mode.

While an orthogonal code is employed so as to encrypt information, or used as a spread code of a spectrum spread communication system, a code stream which is defined as a row vector of a Hadamard matrix is known as this orthogonal code.

This embodiment mode is related to an orthogonal code generating circuit for generating an orthogonal code which is defined as the code stream of this Hadamard matrix. First, referring to the following formulas 1(a) to 1(d), the Hadamard matrix will be explained.

$$H_o = O \qquad \qquad 1(a)$$

$$H_1 = \begin{bmatrix} H_0 & H_0 \\ H_0 & \overline{H_0} \end{bmatrix} = \begin{bmatrix} 0 & 0 \\ 0 & 1 \end{bmatrix} \qquad 1(b)$$

$$H_2 = \begin{bmatrix} H_1 & H_1 \\ H_1 & \overline{H_1} \end{bmatrix} = \begin{bmatrix} 0 & 0 & 0 & 0 \\ 0 & 1 & 0 & 1 \\ 0 & 0 & 1 & 1 \\ 0 & 1 & 1 & 0 \end{bmatrix} \qquad 1(c)$$

$$\vdots$$

$$H_n = \begin{bmatrix} H_{n-1} & H_{n-1} \\ H_{n-1} & \overline{H_{n-1}} \end{bmatrix} \qquad 1(d)$$

First, formula 1(a) indicates a formula representative of such an Hadamard matrix of k=0, 1(b) shows a formula indicative of an Hadamard matrix of k=1, and 1(c) indicates a formula representative of such an Hadamard matrix of k=2, and also 1(d) represents a generic formula indicative of such an Hadamard matrix of k=n. It should be noted that symbols "k" and "n" are integers larger than, equal to 0.

Assuming now that the Hadamard matrix $H_0$ is equal to "0" when k=0, the Hadamard matrix $H_1$ in the case of k=1 becomes such a matrix made of 2 rows×2 columns, as shown in 1(b), and furthermore, the Hadamard matrix H2 in the case of k=2 becomes such a matrix made of 4 rows×4 columns, as indicated in 1(c). Then, when the Hadamard matrix Hn in the case of k=n is expressed by a generic formula, this matrix may constitute such a matrix as indicated in 1(d).

Also, a code stream indicated by a row vector of an Hadamard matrix corresponds to an orthogonal code.

Next, a method for calculating an orthogonal code, which constitutes a basic idea of the present invention, will now be described by employing an Hadamard matrix $H_3$ constructed of 8 rows×8 columns shown in FIG. 1.

FIG. 1 is an explanatory diagram for explaining the orthogonal code calculating method with employment of the Hadamard matrix $H_3$.

In this drawing, it should be understood that, for the sake of easy explanation, both a row number and a column number are applied to this Hadamard matrix $H_3$. A row number corresponds to such a number (code number) indicative of a row (row vector=orthogonal code). In this case, this code number is denoted by a binary number. Since a total number of such rows is equal to 8 rows, these 8 rows are expressed by "000, 001, 010, . . . , 110, 111" from a top row in this order. Also, a column number corresponds to such a number (code stream positional signal) indicative of a position of a column. Since a total number of columns is equal to 8 columns, these 8 columns are expressed as "000, 001, 010, . . . , 110, 111" from a left side in this order.

Now, an attention should be paid to an orthogonal code of a row number of "001." The orthogonal code of this row number "001" corresponds to "01010101."

Then, such a value corresponding to a column number "000" of the orthogonal code of this row number "001" is equal to "0" (namely, first value from left end of orthogonal code), such a value corresponding to a column number "001" thereof is equal to "1" (namely, second value from left end of orthogonal code), and such a value corresponding to a column number "010" is equal to "0" (namely, third value from left end of orthogonal code). Subsequently, 8 columns (in total) of a code stream are constituted in correspondence with column numbers.

In this case, the following fact can be understood: That is the values corresponding to the respective column numbers are equal to such values which are obtained as follows: With respect to row numbers, bits of the same digits of the respective row numbers are multiplied by each other, and then, the multiplied row numbers are exclusively OR-gated with each other.

Before describing the concrete explanations, an explanatory diagram of a calculation method is shown in FIG. 2(a), by which a value corresponding to the column number "000" is calculated with respect to the row number "001." It should be noted that a digit least significant bit, LSB) of 0 bit of the row number "001" is equal to "1"; and both a digit (most significant bit, MSB) of 2 bit thereof are equal to "0." Also, as to the row number "000", all digits of 0 bit through 2 bit are equal to "0."

As described above, in FIG. 2(a), as to the row number "001", the value "0" corresponding to the column number "000" is calculated in such a manner that the bits of the same digits of the row number are multiplied by the bits of the same digits of the column number, and then, the multiplied results are exclusively OR-gated with each other.

Similarly, FIG. 2(b) is an explanatory diagram for explaining a method of calculating a value corresponding to the column number "001" with respect to the row number "001." Also, in FIG. 2(b), as to the row number "001", the value "1" corresponding to the column number "001" is calculated in such a manner that the bits of the same digits of the row number are multiplied by the bits of the same digits of the column number, and then, the multiplied results are exclusively OR-gated with each other.

As a consequence, generally speaking, in the case that a row number has a 3-bit width, as to such a row number "a b c", a number "X" corresponding to a column number "d e f" may be obtained as represented in FIG. 2(c).

Furthermore, even when the value of "k" is changed and thus the row number becomes a k-bit width, such a value of each row of an orthogonal code may be similarly calculated in such a manner that bits of the same digits between the row number and the column number are multiplied by each other, and then, the multiplied results are exclusively OR-gated with each other.

As a result, an orthogonal code equal to a row vector of an Hadamard matrix may be obtained based upon such an AND-gated value that bits of the same digits between a row number and a column number are multiplied by each other, and also an exclusively OR-gated value obtained by exclusively OR-gating an output of this OR-gated value. In other words, in an orthogonal code generating circuit utilizing this calculation method, an orthogonal code may be obtained by combining an AND-gated value with an exclusively OR-gated value, instead of "ROM unit into which orthogonal codes corresponding to code numbers have been stored" provided in the conventional orthogonal code generating circuit. As a consequence, the circuit scale of the orthogonal code generating circuit may be reduced.

FIRST EMBODIMENT MODE

A concrete structure of an orthogonal code generating circuit will now be explained with reference to the corresponding drawings.

FIG. 3 is a structural diagram of an orthogonal code generating circuit according to this first embodiment mode.

As indicated in FIG. 3, the orthogonal code generating circuit 10 is constituted by a counter circuit unit 12, a circuit unit 14 for combining orthogonal codes, and a control circuit unit 16. This combination circuit unit 14 is constructed of an AND gate 14a and an exclusive OR gate 14b. Furthermore, the AND gate 14a is made of such an AND gate group which may multiply bits of the respective columns by each other. This AND gate group owns plural AND gates defined from an AND gate 14a1 for multiplying O-bits of each other, and an AND gate 14a2 for multiplying 1-bits by each other, up to an AND gate 14an for multiplying n-bits by each other. The exclusive OR gate 14b owns an exclusive OR gate 14b1 for exclusively OR-gating outputs of these AND gates 14a1 to 14an.

The counter circuit unit 12 is such a counter circuit that when a code generation starting signal "ST" is entered, this counter circuit unit 12 starts to output a column number corresponding to the code stream positional signal based upon a reference clock "CK." Also, when an initial phase setting signal INI has been set, this counter circuit unit 12 loads the initial phase setting signal INI after the code generation starting signal ST is inputted. While an initial phase setting value set by the initial setting signal INI is employed as an initial phase of the counter circuit unit 12, the counter circuit unit 12 commences its counting operation from this initial phase up to a maximum value is an increment order.

For instance, in the case that the code generation starting signal ST is inputted to the counter circuit unit 12 under such a condition that the counter output width is equal to 2 bits and also the initial phase setting signal INI is set to such a signal corresponding to an initial phase "00", this counter circuit unit 12 outputs counter output data from "00", "01", "10", to "11", namely the maximum value in the increment order in response to the reference clock "CK." It should also be noted that as counter output data, the respective bits are outputted in a parallel manner.

Into the control circuit unit 16, a code designation signal CNo, a switching signal CHG, and a code length designation signal LNG are entered. The code designation signal CNo is to designate a row number (code number) of an Hadamard matrix. The switching signal CHG is employed so as to select a decode output of the control circuit unit 16 as a decode output for the row of the Hadamard matrix, or a decode output for a hierarchical orthogonal code. The code length designation signal LNG is used to designate a code length of an orthogonal code.

The output width of the code designation signal CNo is equal to, for instance, 2 bits. In the case that "00" is designated as the row number (code number), the control circuit unit 16 outputs "0" as both a zero-th bit and a first bit of the decode outputs.

Also, when the decode output of the control circuit unit 16 is switched to the decode output corresponding to the Hadamard matrix in response to the switching signal CHG, for instance, if the row number (code number) of "01" is inputted as the code designation signal CNo, then the zero-th bit of the decode output is "1", and the first bit thereof is "0", which are outputted from the control circuit unit 16.

On the other hand, when the decode output of the control circuit unit 16 is switched to the decode output corresponding to the hierarchical orthogonal code in response to the switching signal CHG, for example, if the row number of "01" is entered as the code designation signal CNo, then the zero-th bit of the decode output is "0", and the first bit thereof is "1", which are outputted from the control circuit unit 16. This is different from the Hadamard matrix case. That is, while the zero-th bit of the decode output is substituted by the first bit thereof, the decode output is provided.

In this case, a hierarchical orthogonal code will now be described with reference to formula (2).

$$C_0(0) = 0 \quad (2)$$

$$\begin{bmatrix} C_1(0) \\ C_1(1) \end{bmatrix} = \begin{bmatrix} C_0(0) & C_0(0) \\ C_0(0) & \overline{C_0(0)} \end{bmatrix} = \begin{bmatrix} 0 & 0 \\ 0 & 1 \end{bmatrix}$$

$$\begin{bmatrix} C_2(0) \\ C_2(1) \\ C_2(2) \\ C_2(3) \end{bmatrix} = \begin{bmatrix} C_1(0) & C_1(0) \\ C_1(0) & \overline{C_1(0)} \\ C_1(1) & C_1(1) \\ C_1(1) & \overline{C_1(1)} \end{bmatrix} = \begin{bmatrix} 0 & 0 & 0 & 0 \\ 0 & 0 & 1 & 1 \\ 0 & 1 & 0 & 1 \\ 0 & 1 & 1 & 0 \end{bmatrix}$$

$$\vdots$$

$$\begin{bmatrix} C_{n+1}(0) \\ C_{n+1}(1) \\ C_{n+1}(2) \\ C_{n+1}(3) \\ C_{n+1}(4) \\ \vdots \\ C_{n+1}(2^{n+1}-2) \\ C_{n+1}(2^{n+1}-1) \end{bmatrix} = \begin{bmatrix} C_n(0) & C_n(0) \\ C_n(0) & \overline{C_n(0)} \\ C_n(1) & C_n(1) \\ C_n(1) & \overline{C_n(1)} \\ C_n(2) & C_n(2) \\ \vdots \\ C_n(2^n-1) & C_n(2^n-1) \\ C_n(2^n-1) & \overline{C_n(2^n-1)} \end{bmatrix}$$

Formula (2) is an explanatory diagram for explaining a hierarchical orthogonal. Similar to the Hadamard matrix, an orthogonal code may be obtained by such a hierarchical orthogonal code. Also, while an orthogonal code $C_0(0)=0$, the orthogonal code is expended as represented by a generic formula located at the bottommost position of the formula. It should be understood that symbol "n" indicates any integer larger than, or equal to 0.

Figure 4:
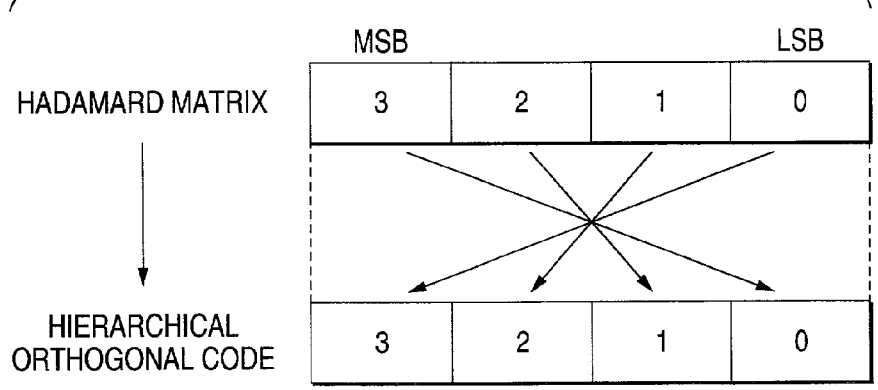
FIGS. 4(a) to 4(b) show explanatory diagrams for explaining a comparison between a hierarchical orthogonal code and an Hadamard matrix.

However, in the case that a matrix becomes larger than, or equal to a matrix of 4 rows×4 columns, this matrix may constitute such a matrix different from an Hadamard matrix. Referring now to FIG. 4, an explanation of a difference between a hierarchical orthogonal code and an Hadamard matrix will be made.

FIG. 4 is an explanatory diagram for explaining a comparison between a hierarchical orthogonal code and an Hadamard matrix. FIG. 4(*a*) is an explanatory diagram for showing a comparison of row numbers, and FIG. 4(*b*) is an explanatory diagram for representing a bit conversion of a row number.

The matrix shown in FIG. 4(*a*) corresponds to such a matrix of a hierarchical orthogonal code constituted by 4 rows×4 columns. A column number is applied to an upper portion of this matrix, and a row number is applied to a right side of this matrix. Both the column number and the row number are binary numbers having 2-bit widths, and are expressed by "00, 01, 10, 11."

Now, when an attention is paid to such an orthogonal code $C_2(1)$ of a row number "01", this orthogonal code is made equal to an orthogonal code of a row number "10" of an Hadamard matrix $H_2$. Also, when an attention is paid to another orthogonal code $C_2(2)$ of a row number "10", it can be seen that this orthogonal code is equal to an orthogonal code of a row number "01" of the Hadamard matrix (see FIG. 1(*c*)).

As a consequence, when the zero-th bit of the row number is replaced by the first bit of this row number in the Hadamard matrix, the resultant orthogonal code is made equal to the orthogonal code of the row number in the hierarchical orthogonal code. Furthermore, FIG. 4(*b*) is an explanatory diagram for explaining such a bit replacing operation in such a case that a bit width of a column number is widened to become a 4-bit width.

In FIG. 4(*b*), an upper stage corresponds to a bit stream of a row number of an Hadamard matrix, and numeral values indicate digits of the respective bits. A lower stage corresponds to a bit stream of a row number of a hierarchical orthogonal code, and numeral values similarly show digits of the respective bits. Arrows made from the upper stage to the lower stage indicate a conversion operation from the Hadamard matrix to the hierarchical orthogonal code. The bits from the most significant bit (MSB) to the least significant bit (LSB) are reversed in a symmetrical manner. For instance, a zero-th bit of the row number of the Hadamard matrix becomes a third bit of the hierarchical orthogonal code, and a third bit of the row number of the Hadamard matrix becomes a zero-th bit of the hierarchical orthogonal code.

As explained above, since the bits defined from the most significant bit (MSB) to the least significant bit (LSB) of the row number of the Hadamard matrix are rearranged in the inverse sense and a also the symmetric manner, the row number of the hierarchical orthogonal code can be designated. The above-explained switching signal CHG corresponds to such a signal used to designate this rearrangement as either the Hadamard matrix purpose or the hierarchical orthogonal code purpose.

Next, a description is made of a code length designation signal "LNG" of the control circuit unit 16. The code length designation signal LNG corresponds to such a signal capable of designating a code length of an Hadamard matrix, which is shorter than, or equal to a maximum code length of this Hadamard matrix. Since this code length designation signal LNG is set, such a decode output corresponding to the designated code length is outputted.

For instance, such a case that a bit width of a row number (code number) is changed from a 3-bit width into a 2-bit width will now be explained with reference to FIG. 5.

Figures 5, 6:
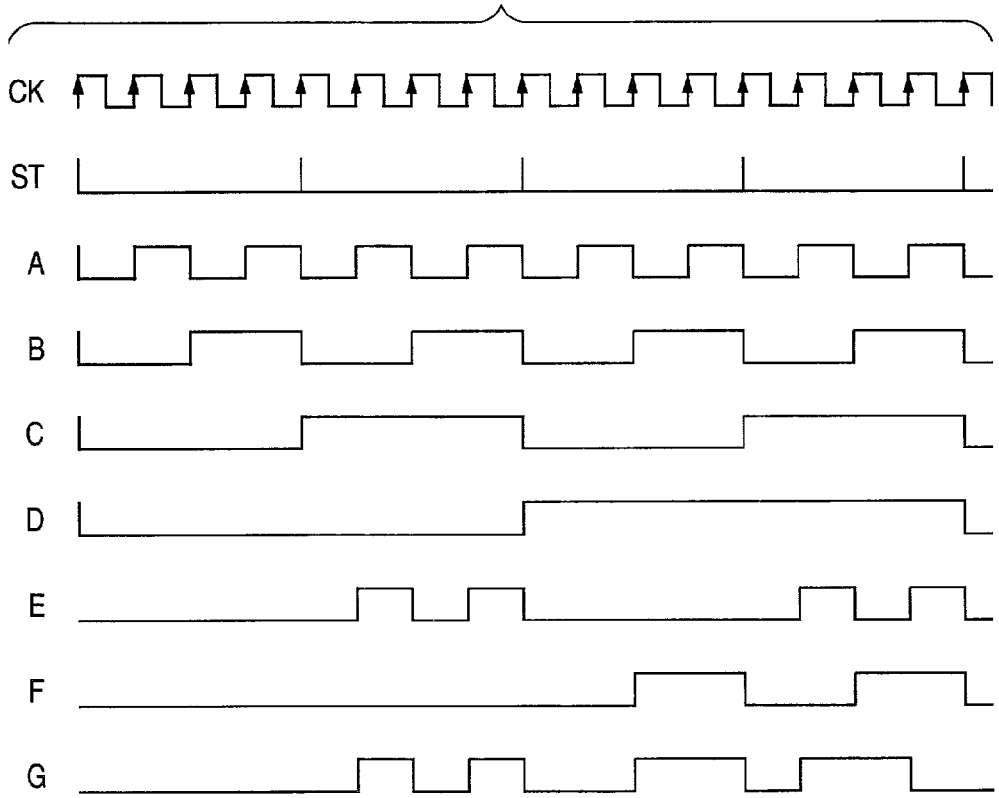
FIG. 5 is an explanatory diagram for explaining a code length designation.
FIG. 6 is a time chart for showing operations of a combination circuit.

FIG. 5 is an explanatory diagram for explaining a designation of a code length.

In an Hadamard matrix "$H_3$", a row number (code number) is represented by a binary number having a 3-bit length. In this case, when such a designation for outputting a decode output having a 2-bit width (4 cycles) is carried out in response to the code length designation signal LNG, the control circuit unit 16 rounds down an upper-grade bit (3rd bit), and outputs only a zero-th bit and a first bit of lower-trade bits as a decode out. For example, in this case, even when a row number "001" is entered as the code designation signal "CNo" into the control circuit unit 16, since the control circuit unit 16 outputs only "01" of a zero-th bit and of a first bit of the lower-grade bit as the decode output, such an orthogonal code may be obtained which is equivalent to the orthogonal code obtained in the case of an Hadamard matrix "$H_2$" under k=2.

The foregoing description is made of the structure of the orthogonal code generating circuit 10.

Subsequently, various sorts of operations of the orthogonal code generating circuit 10 with employment of the above-described arrangement will now be explained.

As for the basic operation, outputting an orthogonal code of Hadamard matrix, the orthogonal code generating circuit 10 outputs an orthogonal code as serial data by carrying out the combinating process operation by the combination circuit unit 14, while the counter output of the counter circuit unit 12 is combined with the decode output of the control circuit unit 16. As a consequence, operations of the combination circuit unit 14 will now be described with reference to FIG. 6.

For the sake of easy explanations, a zero-th bit of the counter output of the counter circuit unit 12 is expressed as a counter output "A", a first bit of the counter output thereof is expressed as a counter output "B", and next, a zero-th bit of the decode output of the control circuit unit 16 is expressed as a decode output "C", and similarly, a first bit of the decode output of the control count unit 16 is expressed as a decode output "D." Then, the output of the AND gate 14a1 for multiplying the zero-th bits by each other is expressed as a product output "E", the output of the AND gate 14a2 for multiplying the first bits by each other is expressed as a product output "F", and the output of the exclusive OR gate 14b1 for exclusively OR-gating the outputs of these AND gates is expressed as a serial output "G."

An initial condition required for explaining this basic operation is given as follows: That is, the initial phase setting signal INI to the counter circuit unit 12 owns a counter output width of 2 bits, and this initial phase setting signal INI is set to such a signal corresponding to an initial phase "00." Furthermore, the code signation signal CNo to the control circuit unit 16 owns an output width of 2 bits, "00" is designated as the row number (code number), and this row number is sequentially changed into "01, 10, 11" in response to the input of the code generation starting signal ST. Also, while the switching signal CHG is switched to the Hadamard matrix purpose, the code length designation signal LNG is designated for the decode output having the 2-bit width.

In addition, both the AND gate 14a1 and the AND gate 14a2 are "AND" gate circuits, and the exclusive OR gate 14b1 is an "Ex-OR" gate circuit.

Under the above-described setting conditions and structures, a time chart will now be considered. First, when the code generation starting signal ST is entered into the counter circuit 12, this counter circuit unit 12 commences its counting operation in the increment order of the row numbers "00, 01, 10, 11" in response to the reference clock CK. As a result, the counter output A is changed into "0, 1, 0, 1", and the counter output B is changed into "0, 0, 1, 1."

Then, when the first code generation starting signal ST is entered, the decode output is equal to "00." Every time the code generation starting signal ST is entered, the decode output becomes "01, 10, 11", so that the decode output "C" is changed into "0, 1, 0, 1", and the decode output "D" becomes "0, 0, 1, 1."

Then, a final serial output "G" via the product output "E" and the product output "F" is equal to "0000" when the first code generation starting output signal ST is entered. A final serial output "G" is equal to "0101" when a first next code generation starting signal ST is entered. A final serial output "G" is equal to "0011" when a second next code generation starting signal ST is inputted. Then, a final serial output "G" is equal to "0110" when a third next code generation starting signal ST is entered. Considering this serial output "G", the following facts can be revealed: When the first code generation starting signal ST is entered, the resulting serial output "G" is equal to the orthogonal code itself of the row number "00." When the first next code generation starting signal ST is inputted, the resulting serial output "G" is equal to the orthogonal code of the row number "01". When the second next code starting signal ST is entered, the resulting serial output "G" is equal to the orthogonal code of the row number "10". When the final code generation starting signal ST is inputted, the resulting serial output "G" is equal to the orthogonal code of the row number "11" (see FIG. 1).

As a consequence, since the ROM unit of the prior art for storing the orthogonal codes can be omitted from the orthogonal code generating circuit 10 of the present invention, the circuit scale of the orthogonal code generating circuit 10 can be reduced. In addition, even when the code number of the orthogonal code is increased, the decode output may be simply increased in connection thereto. As a result, since the ROM unit is no longer increased which is conversely increased in the prior art, it is possible to avoid increasing of the circuit scale.

Also, the above-described code designation signal CNo is sequentially changed in response to the input of the code generation starting signal ST, for the sake of easy explanations. Alternatively, for instance, in such a case that only the orthogonal code "0101" is outputted, "01" may be merely set. In this case, when the code generation starting signal ST is inputted to the counter circuit unit 12, the orthogonal code "0101" may be outputted.

Also, in order to reduce the circuit scale, the above-explained AND gate 14a is constructed of the AND gate circuit, and the above-described exclusive-OR gate 14b1 is constructed of the EX-OR gate circuit. Alternatively, if only the exclusive-OR gate 14b1 is constructed of an EX-NOR gate circuit, then an inverted orthogonal code may also be obtained. Furthermore, a similar serial output "G", or an inverted serial output "G" may be obtained by rearranging logic circuits employed in the combination circuit unit 14.

Next, as for the output of Hierarchical Orthogonal Code, an output of an orthogonal code will now be indicated, which is defined as a code stream of a hierarchical orthogonal code.

A different technical point from the above-described normal operation is featured by that the switching signal CHG is switched to the signal used for the hierarchical orthogonal code. In response to this switching signal CHG, the control circuit unit 16 rearranges bits of row numbers of an Hadamard matrix from a most significant bit (MSB) thereof up to a lease significant bit (LSB) thereof in an inverse sense and in a symmetrical manner so as to designate row numbers of a hierarchical orthogonal code.

In this case, final serial outputs G will be produced as follows: That is, a final serial output is equal to "0000" when the first code generation starting output signal ST is entered. A final serial output "G" is equal to "0011" when a first next code generation starting signal ST is entered. A final serial output "G" is equal to "0101" when a second next code generation starting signal ST is inputted. Then, a final serial output "G" is equal to "0110" when a third next code generation starting sinal ST is entered. Considering this serial output "G", the following facts can be revealed: When the first code generation starting signal ST is entered, the resulting serial output "G" is equal to the orthogonal code $C_2(0)$ itself of the row number "00" of the hierarchical orthogonal code. When the first next code generation starting signal ST is inputted, the resulting serial output "G" is equal to the orthogonal code $C_2(1)$ of the row number "01" of the hierarchical orthogonal code. When the second next code starting signal STW is entered, the resulting serial output "G" is equal to the orthogonal code $C_2(2)$ of the row number "10" of the hierarchical orthogonal code. When the final code generation starting signal ST is inputted, the resulting serial output "G" is equal to the orthogonal code $C_2(3)$ of the row number "1" of the hierarchical orthogonal code (see FIG. 4).

As a consequence, in this case, while the orthogonal code generating circuit 10 for generating the orthogonal codes which are defined as the code stream of the Hadamard matrix is employed, such orthogonal codes which are defined as the code stream of the hierarchical orthogonal code can be generated by replacing the bits of the row numbers (code designation signal) from the upper-grade bit to the lower-grade bit in the symmetrical manner.

In this case, the orthogonal code by the Hadamard matrix and the orthogonal code by the hierarchical matrix are selectively switched by the switching signal CHG. Alternatively, while the above-described selection by the switching signal CHG is not carried out, the decode output of the control circuit unit 16 may be generated in such a manner that only the output of the orthogonal code of the hierarchical orthogonal code may be obtained.

[Designation of Code Length]

Next, such a serial output "G" in the case that a code length is designated is indicated.

A technical different point from the above-explained [Normal Operation] is given as follows: Such a code length which is shorter than, or equal to a maximum code length of a Hadamard matrix is designated based upon the code length designation signal LNG. For instance, when such a designation is made so as to output a decode output having a 1-bit width (2 cycles), the control circuit unit 16 outputs only a zero-th bit as the decode output. It should be noted that when the code generation starting signal ST is entered at this stage, the counter circuit unit 12 outputs the counter outs such as "0,1" up to the maximum value of the row number equal to the code stream positional signal in the increment manner.

In this case, the serial output "G" becomes "0001." This serial output "G" represents both the orthogonal code "00" and the orthogonal code "01" in the case of the Hadamard matrix $H_1$ of k=1 (see FIG. 1(b)).

As a consequent, even when such orthogonal codes having different code lengths are produced, the orthogonal code generating circuit 12 may output the orthogonal codes having the different code lengths, while the circuit scale thereof is not increased, but also the circuit arrangement for switching the hierarchical orthogonal code signal and the Hadamard matrix code signal is not made complex.

Next, as for Initial Phase Designation, such a serial output "G" in the case that an initial phase is designated is represented. A technical different point from the above-explained "Normal Operation" is given as follows: That is, the initial phase is not equal to "00." For example, assuming now that the initial phase is equal to "01", the serial output "G" becomes "000" when the first code generation starting signal ST is entered. In other words, since the starting initial phase of the orthogonal code is changed from "00" to the next "01", the first bit "0" during the above-explained "Normal Operation" disappears, and the orthogonal code from the next "0" is generated.

Also, when the first next code generation starting signal ST is entered, the serial output "G" is equal to "101"; when the second next code generation starting signal ST is entered, the serial output "G" is equal to "011"; and when the third next code generation starting signal ST is entered, the serial output "G" is equal to "110." As a consequence, the initial phase of the counter circuit unit 12 can be set.

SECOND EMBODIMENT MODE

Next, a description will now be made of a spreading process apparatus using the orthogonal code generating circuit of the hierarchical orthogonal code, according to the present invention, with reference to FIG. 7 and FIG. 8.

Figure 7:
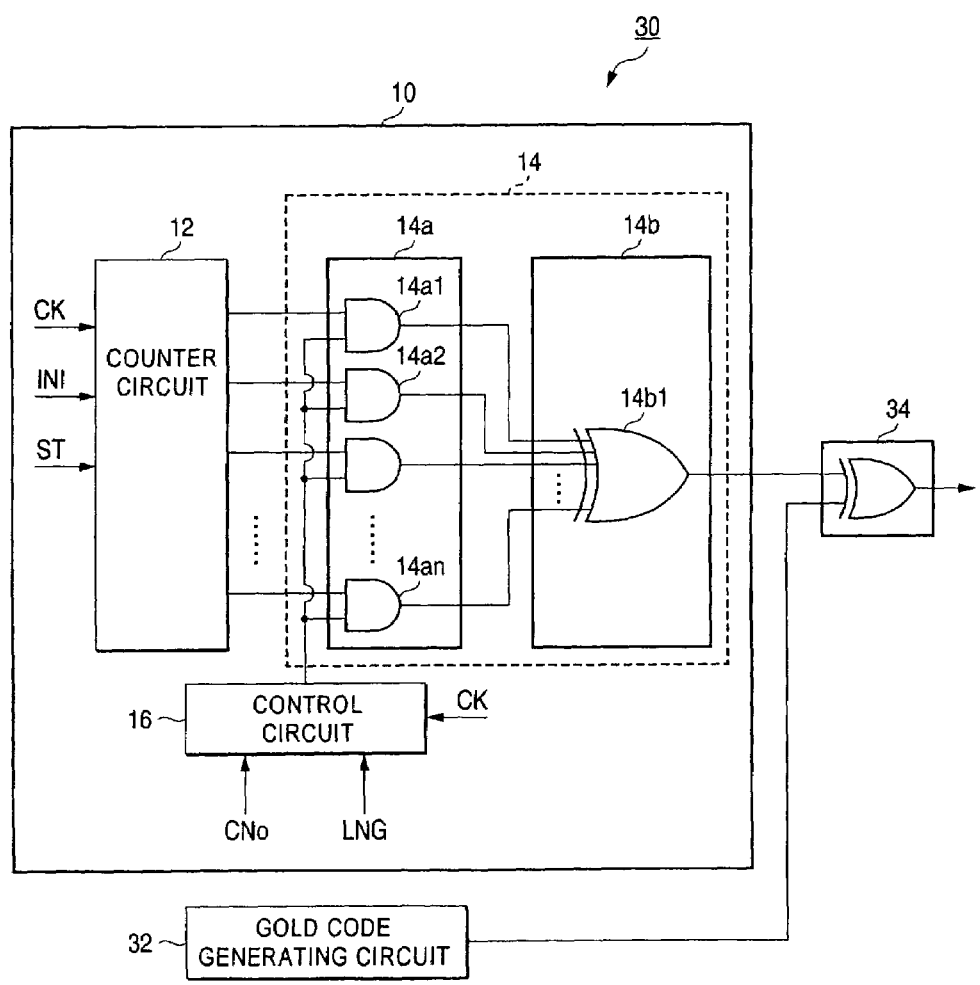
FIG. 7 is a structural diagram for showing an arrangement of a spreading process apparatus.

FIG. 7 is a structural diagram for representing a structure of a spreading process apparatus 30, and FIG. 8 is a diagram for showing a hierarchical orthogonal code when n=3.

The spreading process apparatus 30 is arranged by an orthogonal code generating circuit 10, a GOLD code generating circuit 32, and an exclusive OR gate circuit 34. The GOLD code generating circuit 32 is used to generate a GOLD code corresponding to a spread code. The exclusive OR gate circuit 34 exclusively OR-gates both an orthogonal code outputted from the orthogonal code generating circuit 10 and a GOLD code outputted from the GOLD code generating circuit 32.

It should also be understood that since the structure of the orthogonal code generating circuit 10 according to this second embodiment mode is the same as the structure of the orthogonal code generating circuit 10 according to the first embodiment mode, the same reference numerals are applied to the same, or similar units, and therefore explanations thereof are omitted. Also, it is so assumed that the control circuit unit 16 executes to output a decode output corresponding to a hierarchical orthogonal code.

FIG. 8 represents orthogonal codes with respect to code numbers in the case of n=3 in the matrix of the hierarchial orthogonal codes indicated in FIG. 5. In this case, the spreading process circuit 30 performs such an operation for producing 8 sorts of spread codes to which code numbers 000 to 111 are applied.

The orthogonal code generating circuit 10 serially outputs such hierarchical orthogonal codes which are arranged by 8 orthogonal codes within 1 cycle, whereas the GOLD code generating circuit 32 serially outputs GOLD codes. When the hierarchical orthogonal codes and the GOLD codes are entered into the exclusive OR gate circuit 34, these codes are exclusively OR-gated, so that the exclusive OR gate circuit 34 may produce Spreading codes in a serial manner. It should also be noted that even when the value of "n" is changed, the Spreading codes may be outputted in the serial manner by way of this operation by the spreading process apparatus 30.

Now, a Spreading code will be explained.

In a spectrum spread communication, a spread modulation is carried out by employing different spread codes every communication channel so as to transmit a signal, and a despreading operation must be carried out on the reception side by using the same code as the spread code employed on the transmission side. To this end, both the detection of the spread code and the timing should be established in the initial synchronization.

As this initial synchronization method, a 3-stage initial synchronization method is employed. In this 3-stage initial synchronization method, an establishment of a chip synchronization is carried out at a first stage; both an identification of a Spreading code group and an establishment of frame timing are carried out at an second stage; and then, a Spreading code is identified at a third stage. In both the second stage and the third stage, an identification is carried out as to one sort of spread codes among plural sorts of spread codes.

The spreading process operation 30 may be employed so as to execute the process operation at the third stage in this three-stage initialization synchronization system.

As a consequence, the spreading process apparatus 30 may produce the plural sorts of spread codes in the serial manner, which employs the hierarchical orthogonal code, by using the orthogonal code generating circuit 10 and also a small number of logic circuits (exclusive OR gate circuit 34), and also, the circuit scale of the Spreading code identification circuit for the 3-stage processing operation can be reduced.

It should also be noted that even when the orthogonal code generating circuit 10 is combined in a demodulating precoces apparatus and a synchronizating process operation in a similar manner to the spreading process apparatus 30, the circuit scales of the respective apparatuses may be reduced.

THIRD EMBODIMENT MODE

Figure 9:
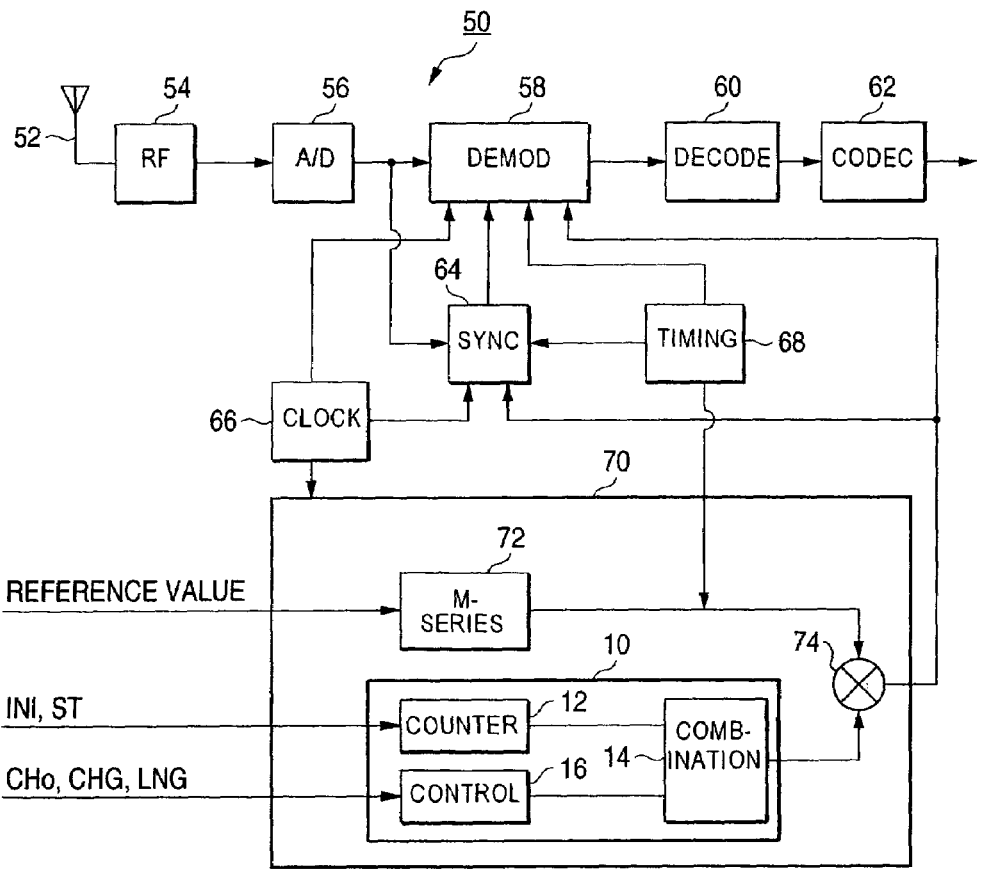
FIG. 9 is a structural diagram for indicating a structural of a reception apparatus for a spectrum spread signal.
Figure 10:
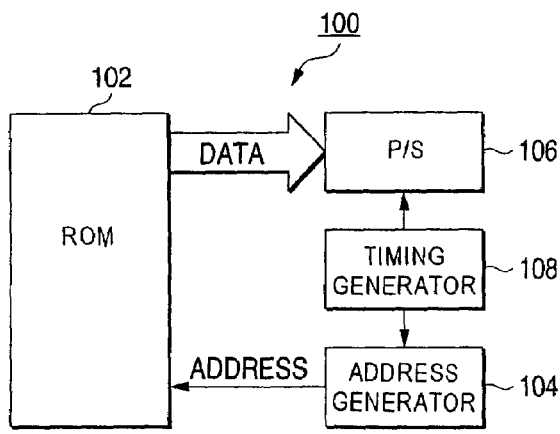
FIG. 10 is a structural diagram for showing the conventional orthogonal code generating circuit.

Referring now to FIG. 9, a description is made of a reception apparatus of a spectrum spread signal with employment of the orthogonal code generating circuit of he hierarchical orthogonal code, according to the present invention.

FIG. 9 is a structural diagram for representing an arrangement of a reception apparatus 50 of a spectrum spread signal.

The reception apparatus 50 is arranged by a reception antenna 52, a high frequency (radio frequency) signal processing unit 54, an A/D converter 56, a demodulating process unit 58, a decoding process unit 60, a CODEC unit 62, a synchronizing process unit 64, a clock generating unit 66, a timing control unit 68, and also a spread code generating circuit 70. The high frequency signal processing unit 54 performs a filtering operation of a reception signal received by the reception antenna 52 at a predetermined frequency, and an amplification operation of the filtered signal. The A/D converter 56 converts an analog signal outputted from the high frequency signal processing unit 54 into a digital signal corresponding to this analog signal. The demodulating process unit 58 demodulates the reception signal. The decoding process unit 60 decodes the demodulated reception signal. The CODEC unit 62 converts the decoded reception signal into a speech signal (voice signal). The synchronizing process unit 64 is to perform a synchronization capturing operation. The clock generating unit 66 supplies a reference clock "Ck" to a predetermined unit. The timing control unit 68 controls process timing of a preselected unit.

Also, the spread code generating circuit 70 is constituted by an M-series generating unit 72, a calculation processing unit 74, and an orthogonal code generating circuit 10. It should also be noted that since the structure of the orthogonal code generating circuit 10 according to the third embodiment mode is identical to the structure of the orthogonal code generating circuit 10 according to the first embodiment mode, the same reference numerals will be employed as those for denoting the same units.

While a reception base band signal is supplied from the A/D converter 56 to the synchronizing process unit 64 and this reception base band signal is spread/modulated, the reference clock CK is furthermore supplied from the clock generating unit 66 to this synchronizing process unit 64. Then, this synchronizing process unit 64 executes the despreading calculation of the reception base band signal which is supplied from the A/D converter 56, and outputs the synchronization captured result to the demodulating process unit 58.

Then, the demodulating process unit 58 performs the data demodulation of the reception signal based upon the synchronization captured result obtained from the synchronizing process unit 64, and then outputs the demodulated data to the decoding precesses unit 60. At this stage, the timing control unit 68 controls such a timing of the despreading operation.

Also, since the spread code generating circuit 70 supplies the spread code to both the synchronizing process unit 64 and the demodulating process unit 58, the correlations detection by the orthogonal code is utilized in the judgment of the data series.

As explained above, in the reception apparatus 50 of the spectrum spread signal, which employs the orthogonal code generating circuit 10 according to this third embodiment mode, the spread codes can be produced in the serial manner by the small-scaled circuit. As a consequence, the circuit scale of the reception apparatus 50 can be reduced.

Furthermore, similar to this third embodiment mode, the circuit scales as to the below-mentioned unit/apparatus/system can be reduced, namely, a spreading process unit having the orthogonal code generating circuit 10 according to the first embodiment mode; a transmission apparatus of a spectrum spread signal, which employs this spreading process unit; both a base station apparatus and a mobile terminal apparatus, which employ this transmission apparatus and the above-explained reception apparatus 50; and a mobile communication system arranged by this base station apparatus and a mobile terminal apparatus.

In accordance with this orthogonal code generating circuit, both the parallel output of the counter circuit unit and the decode output of the control circuit unit are combined by the combination circuit unit so as to output the serial data of the orthogonal code. As a result, since the ROM unit of the prior art can be omitted which is used to store the orthogonal codes, the circuit scale of the orthogonal code generating circuit can be reduced.

Also, even when the code number of the orthogonal code is increased, the decode output may be merely increased in connection thereto. Also, since the ROM unit is no longer increased, the increase of the circuit scale can be prevented, although the ROM unit is increased in the prior art.

What is claimed is:

1. An orthogonal code generating circuit for generating an orthogonal code which is defined as a code stream of a Hadamard matrix constructed of $2^k \times 2^k$ wherein "k" is an integer larger than, or equal to 0, comprising:

a counter circuit unit for counter-outputting code stream positional signals of said Hadamard matrix from a predetermined initial value up to a maximum value in an increment order when a code generation starting signal is entered into said counter circuit unit;

a control circuit unit for outputting a decode output based upon a code designation signal used to designate a code number of said Hadamard matrix; and a combination circuit unit for AND-gating said counter-output derived from said counter circuit unit and said decode output derived from said control circuit unit and for exclusively OR-gating output bits generated by said AND-gating to thereby output serial data of said orthogonal code, wherein said control circuit unit outputs said decode output in such a manner that since a code length designation signal for designating a code length shorter than, or equal to a maximum code length is inputted, said code designation signal is used so as to designate a code length designated based upon said code length designation signal; and said combination circuit unit outputs said orthogonal code made based upon said code designation signal for the code length designated.

* * * * *